United States Patent [19]
Rio et al.

[11] 3,915,592
[45] Oct. 28, 1975

[54] BOLTED ROTOR ATTACHMENT

[75] Inventors: Richard A. Rio, Glastonbury; John R. Larrabee, Portland, both of Conn.

[73] Assignee: United Technologies Corporation, Hartford, Conn.

[22] Filed: Feb. 25, 1974

[21] Appl. No.: 445,768

[52] U.S. Cl. ............... 416/171; 416/201; 417/407
[51] Int. Cl.² .................................... F04D 29/04
[58] Field of Search .......... 60/39.31; 417/408, 406, 417/407; 416/198 A, 199, 201, 171

[56] References Cited
UNITED STATES PATENTS

| | | | |
|---|---|---|---|
| 2,621,018 | 12/1952 | Barrett | 416/201 |
| 2,639,885 | 5/1953 | Ledwith | 416/201 |
| 2,650,017 | 8/1953 | Pedersen et al. | 416/201 |
| 2,738,125 | 3/1956 | Ledwith | 416/171 |
| 2,801,071 | 7/1957 | Thorp | 416/201 |
| 2,922,618 | 12/1960 | Paulson | 416/201 |
| 3,706,509 | 12/1972 | Britt | 416/198 A |

FOREIGN PATENTS OR APPLICATIONS 777,572    6/1957    United Kingdom............... 60/39.31

*Primary Examiner*—C. J. Husar
*Assistant Examiner*—O. T. Sessions
*Attorney, Agent, or Firm*—Charles A. Warren

[57] ABSTRACT

An attachment of a turbine disk to a compressor disk in which one of the disks is overhung, the attachment including a shaft on one disk connected to a hub on the other disk by a row of axially extending bolts extending through the shaft and hub and arranged in a circle concentric to the axis of the disks hub and shaft.

4 Claims, 2 Drawing Figures

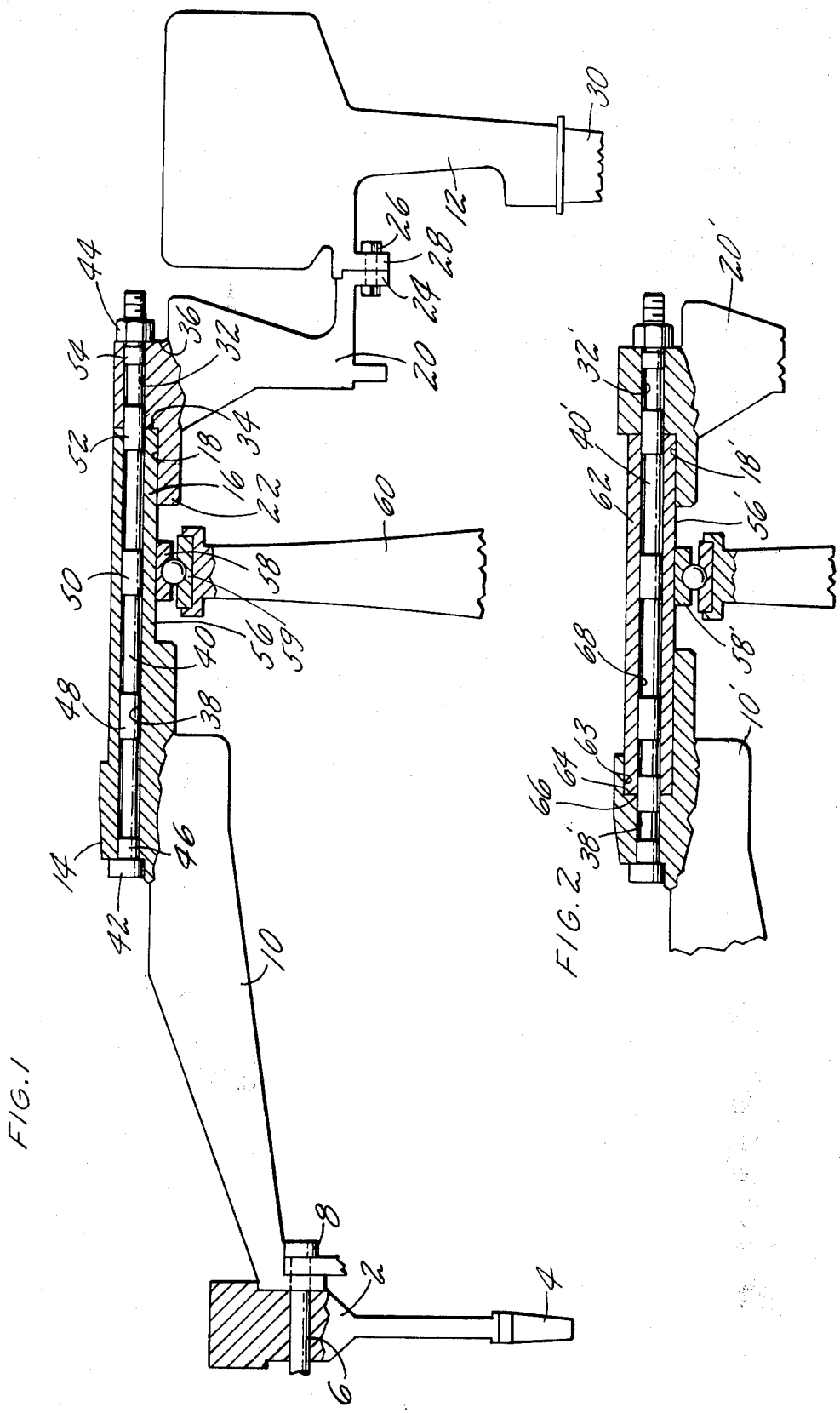

3,915,592

BOLTED ROTOR ATTACHMENT

BACKGROUND OF THE INVENTION

This invention relates to a bolted hub joint especially adapted for use in attachment of a turbine rotor and compressor rotor together in spaced relation in a turbine engine.

In high performance gas turbines the rotors are highly loaded and are also subjected to extreme thermal stresses both in steady state operation and in transient state such as in starting, stopping and acceleration or deceleration. Such stresses affect the life of the rotor assembly and thus the life of the engine. Other important aspects are the spacing of the turbine and rotor disks on the same shaft and the bending loads especially when one of the disks is overhung beyond the supporting bearing. Each rotor, consisting of turbine and compressor disks rotating as a unit is desirably axially separable for purposes of assembly and disassembly.

For such axial assembly the respective turbine disk assembly includes a hub or shaft and the compressor disk assembly also includes a hub or shaft and the two assemblies are splined together for transmitting, in operation, the torque from the turbine disk to the compressor disk. Such splines fail to mesh properly during all operating conditions and thus affect detrimentally the torque loadings and the critical speeds and the wear on the splines reduces the engine life.

STATEMENT OF THE INVENTION

The principal feature of the present invention is an attachment that avoids the above objections and at the same time gives a longer life. Another feature is a joint that will remain tight during all operating conditions with less load fluctuation during transient conditions.

According to the invention the turbine and rotor disks are connected by a hub and shaft assembly one of which is attached to each disk, and with the hub and shaft held in axial assembly by a row of axially extending bolts located in rows of aligned holes in the parts, with the bolts suitably stressed in assembly. The shaft may have a cylindrical outer surface at one point around which a bearing may be positioned for supporting the assembled rotor in the engine.

Other features and advantages will be apparent from the specification and claims and from the accompanying drawings which illustrate an embodiment of the invention.

BRIEF DESCRIPTION OF THE DRAWINGS

FIG. 1 is a longitudinal sectional view through a rotor assembly.

FIG. 2 is a fragmentary view of a modified assembly.

DESCRIPTION OF THE PREFERRED EMBODIMENT

The rotor of the invention is adapted for use particularly in a twin spool gas turbine engine of the type shown by way of example in Savan U.S. Pat. No. 2,747,367. In such an engine there is a low pressure spool comprising a compressor and turbine rotor connected by a shaft, the latter being surrounded by a high pressure rotor also comprising compressor and turbine rotors and an interconnecting shaft. The high pressure rotor rotates independantly of the low pressure rotor and thus there is a clearance between the low pressure shaft and the high pressure rotor surrounding it. The present invention is specifically applicable to the high pressure rotor assembly.

Referring to FIG. 1, the rotor assembly shown includes a compressor rotor disk 2 having a row of blades 4 on the periphery and also having a row of holes 6 therethrough to receive a row of bolts 8 by which other compressor disks not shown may be attached to the disk 2. The bolts 8 also hold a shaft 10 on the disk, the shaft forming a part of the interconnection from the compressor disk 2 to a turbine disk 12. The shaft 10 is shown as somewhat conical from the disk 2 to a shoulder 14 on the inner surface of the shaft. From the shoulder the shaft is generally cylindrical to the end 16 remote from the disk 2. This end 16 is received in an annular recess 18 in a hub 20. The recess forms an axially extending flange 22 surrounding the end 16 of the shaft.

The hub 20 has a peripheral flange 24 secured as by a row of bolts 26 to the turbine disk 12, the latter having a mating bolting flange 28. The rotor 12 has a row of blades 30 on the periphery. The hub has a row of axially extending holes 32 therethrough from the shoulder 34 at the base of the recess 18 to a shoulder 36 at the other side of the hub. This row of holes 32 are in alignment with corresponding row of holes 38 in the shaft 10 from the end 16 to the shoulder 14.

These mating rows of holes receive tie bolts 40 by which the hub and shaft are held securely together. The bolts have attachment means at opposite ends, the bolt heads 42 engaging shoulder 14 and the nuts 44 engaging shoulder 36. The bolts are preferably a tight fit in the holes at certain points in their lengths, for example at the lands 46, 48 and 50 located in the shaft engaging portion, the land 52 overlying the mating ends of the holes in shaft and hub, and the land 54 in the hub engaging portion.

The land 50 is located within the shaft at a place adjacent to the end of the flange 22 and in this location the shaft has a cylindrical outer surface 56 to be engaged by a bearing member 58. This member 58 supports the rotor assembly at the turbine end and thus the turbine rotor is overhung with respect to this bearing. The bolted assembly of the rotor permits the turbine rotor to be overhung without placing an undue load on the rotor assembly. The bearing member 58 cooperates with a fixed bearing member 59 in a support structure 60.

In assembly, the tie bolts 40 may be hydraulically stretched when the nuts are tightened to assure a more uniform load during all steady state and transient conditions. This form of assembly permits disassembly for removal of the two parts of the rotor from the engine without disturbing the bearing structure. Such an assembly also permits the length of the overhang on the rotor to be less than with the conventional bolted flange or splined connection. Since the shaft and hub can be made of different materials the problems of thermal stresses may be minimized.

This type of connection also permits making another joint in the rotor assembly without increasing the length or without the need for a spline. An extra joint permits in effect the shaft 10 to be in two pieces when thermal incompatibility exists between the hub and shaft. As shown in FIG. 2, the hub 20' accepts a sleeve 62 in the recess 18' and this sleeve corresponds to the end portion of the shaft 10. The sleeve 62 at the end remote from the hub recess 18' fits in a recess 63 in shaft 10' and the end 64 thereof engages a shoulder 66 in the recess 63. This sleeve 62 has a row of axial holes 68 that align with holes 32' and 38' in hub 20' and shaft 10' respectively to receive tie bolts 40'. The cylindrical surface 56' accepts the bearing member 58'. The extra element, the sleeve 60, which may be a different material than either hub or shaft for thermal compatibility under all operating conditions has been added without a significant change in the overall dimensions of the rotor assembly as will be apparent.

It should be understood that the invention is not limited to the particular embodiments shown and described herein, but that various changes and modifications may be made without departing from the spirit or scope of this novel concept as defined by the following claims.

Having thus described typical embodiments of my invention, what we claim as new and desire to secure by Letters Patent of the United States is:

1. A shaft connection between a compressor disk and a turbine disk, located in spaced relation on a common axis, the connection including:

an elongated shaft having at one end an extending conical portion with a row of holes on a peripheral flange at the end remote from the shaft for attachment to one of the disks, a hub having attachment means on its outer periphery for attachment to the other of the disks, said hub having an annular recess therein at the end remote from the attachment means and formed by an axially extending flange to receive the end of the shaft remote from the conical portion;

each of said hub and shaft having a row of axially extending holes therethrough arranged in a ring around the axis of said hub and shaft, the diameter of the ring of holes being smaller than the diameter of the axial flange so that the holes are inside the recess in the hub, and said holes in the hub and shaft being in alignment with one another, the holes in the shaft extending from the conical portion end to the hub, and a row of elongated bolts extending through said aligned rows of holes to hold the shaft and hub together, said shaft being long enough to have a cylindrical outer bearing surface between the hub and the conical portion.

2. A shaft connection as in claim 1 in which the shaft and hub are hollow.

3. A turbine rotor assembly including:

a compressor rotor disk;

an elongated shaft having a conical extension from one end thereon, said extension being attached at the end remote from the shaft to one side of the disk and extending therefrom, said shaft being hollow and having an inner radial shoulder thereon at the end of the shaft from which the extension projects, said shaft also having a row of holes extending through said shaft from said shoulder to the end of the shaft remote from the shoulder, said shaft being elongated and cylindrical in the area receiving the holes and being substantially conical from said shoulder to the compressor disk;

a hub having a recess at one side to receive the end of the shaft remote from the disk and having a row of holes axially therethrough from said recess to the opposite side of the hub, said holes corresponding in spacing and dimension to the holes in the shaft and in alignment therewith, said hub having a shoulder on the side opposite to the recess and overlying the ends of the holes in the hub;

a row of bolts in said holes to hold the shaft and hub togther axially, and a turbine rotor disk attached to the hub adjacent the outer periphery of the hub, said shaft being long enough to have a cylindrical outer bearing surface thereon between the hub and the conical extension.

4. A turbine rotor assembly as in claim 3 in which the bolt has attachment means at opposite ends comprising a bolt head at one end and a clamping nut at the other, with said attachment means at opposite ends engaging the shoulder on the shaft and the shoulder on the hub respectively.

* * * * *